United States Patent [19]

Davidson

[11] 3,761,896

[45] Sept. 25, 1973

[54] MEMORY ARRAY OF CELLS CONTAINING BISTABLE SWITCHABLE RESISTORS

[75] Inventor: Evan E. Davidson, Hopewell Junction, N.Y.

[73] Assignee: International Business Machines Corporation, Armonk, N.Y.

[22] Filed: Apr. 18, 1972

[21] Appl. No.: 245,221

[52] U.S. Cl. .............................. 340/173 R, 307/238
[51] Int. Cl. ..... G11c 11/34, G11c 5/02, G11c 7/00
[58] Field of Search ................ 340/173 NR, 173 SP, 340/173 R; 307/238, 206

[56] References Cited

UNITED STATES PATENTS

| | | | |
|---|---|---|---|
| 3,206,730 | 9/1965 | Igarashi | 340/173 NR |
| 3,488,636 | 1/1970 | Dyck | 340/173 SP |
| 3,201,764 | 8/1965 | Parker | 340/173 SP |

OTHER PUBLICATIONS

Todd, Combining Transistors With Tunnel Diodes, 8/19/60, Electronics, pp. 59–61.

Chesarek, Storage Cell Circuit for an Associative Memory, IBM Technical Disclosure Bulletin, Vol. 7, No. 9, 2/65, p. 846.

Cole, Hiobium Oxide Read–Only Memory, 3/70, IBM Technical Disclosure Bulletin, Vol. 12 No. 10, p. 1562.

*Primary Examiner*—Bernard Konick
*Assistant Examiner*—Stuart Hecker
*Attorney*—Julius B. Kraft et al.

[57] ABSTRACT

A monolithic semiconductor memory array in which the cells comprise a voltage divider circuit formed by a fixed resistor in series with a variable switchable bistable resistor settable to either a high or a low resistance state respectively in response to the application of a pair of electrical potentials of opposite polarities.

13 Claims, 4 Drawing Figures

MEMORY ARRAY OF CELLS CONTAINING BISTABLE SWITCHABLE RESISTORS

BACKGROUND OF INVENTION

The present invention relates to monolithic semiconductor memory arrays and, more particularly, to such arrays having cells utilizing switchable variable bistable resistors.

Because of their non-volatile characteristics, bistable resistors have, in recent years, been given extensive consideration as devices in monolithic semiconductor memories. Such bistable devices exhibit high and low impedance or resistance states, and are switchable to such high and low impedance states respectively by the application of electrical potentials of opposite polarities. Such non-volatile, switchable bistable resistors may have varying structures. They include variable resistance elements described in U.S. Pat. Nos. 3,241,009 and 3,467,945, as well as the metal/niobium oxide/bismuth or antimony resistors described in U.S. Pat. No. 3,336,514. Other switchable bistable resistors are heterojunction devices having a first region of one material and one conductivity type and a second region of a second material forming a junction with the first region, the second region containing a high density of material imperfections.

Another class of devices exhibiting such bistable resistance characteristics are Ovonic devices which are described in the article "Non-Volatile and Reprogrammable, The Read-Mostly Memory is Here," by R. G. Neale et al., *Electronics*, Sept. 28, 1970, page 56.

All of the switchable bistable resistors of the type mentioned hereinabove have a V-I impedance characteristic of the type shown in FIG. 3 of the present application. The devices exhibit two distinct impedance states, a relatively high impedance state illustrated by line 30, and a relatively low impedance state, line 31. If the switchable resistor is in a high impedance state, the application of a positive potential having a value greater than $V_p$ will cause the resistor to switch, as shown by dotted line 32, from its high impedance state to its low impedance state, illustrated by line 31. Then, when switching from the low impedance state to the higher impedance state, the voltage level is dropped to negative polarity level greater than $V_n$, and the resistor is switched back to high impedance state, line 30, via line 33.

Because the memory art utilizing non-volatile switchable bistable resistors is still in its rudimentary or developmental stages, there remains a need for monolithic memory structures utilizing such resistors which provide permanent non-volatile storage, rapid reading and writing times and have consistent switching thresholds. In addition, because of the ever-increasing density of monolithic memories, there is a need for monolithic memories employing switchable resistors which utilize only minimal power dissipation.

SUMMARY OF INVENTION

Accordingly, it is a primary object of the present invention to provide a monolithic memory structure employing switchable bistable resistors in its cells which have rapid read and write times, consistent switching thresholds and permanent non-volatile storage, as well as utilizing minimal power dissipation.

It is another object of the present invention to provide a monolithic memory array structure in which switchable resistor devices are readily integratable with conventional planar semiconductor devices.

In accordance with the present invention, the monolithic semiconductor integrated circuit memory array which comprises a plurality of word drive lines and bit drive lines crossing the word lines has an array of memory cells, each of which comprises a voltage divider formed by the combination of a fixed resistor in series with the switchable bistable resistor. Means are provided for applying potentials of opposite polarities across the pair of resistors in series to respectively either switch the switchable resistor to its high or its low impedance state, in order to write a "one" or a "zero" into the cell.

For reading or sensing purposes, the control terminal of a transistor is connected to the node between the two resistors in series; the transistor is normally non-conductive. For such reading, the cell includes the source of potential providing a third potential applied across the resistors in series. The resistors have a voltage-dividing relationship such that when said third electrical potential is applied across the resistor series, the node connected to the control terminal of the transistor will assume a potential level necessary to render the transistor conductive only when the variable switchable resistor is in a predetermined one of its two possible states. The output of the transistor is conveniently connected to a particular bit line in the array, and means are provided for sensing the bit line in order to determine whether the transistor is conductive, a conductive transistor being indicative of the presence of one state in the switchable resistor, while the non-conductivity in the transistor is indicative of the other state of the resistor.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 1:
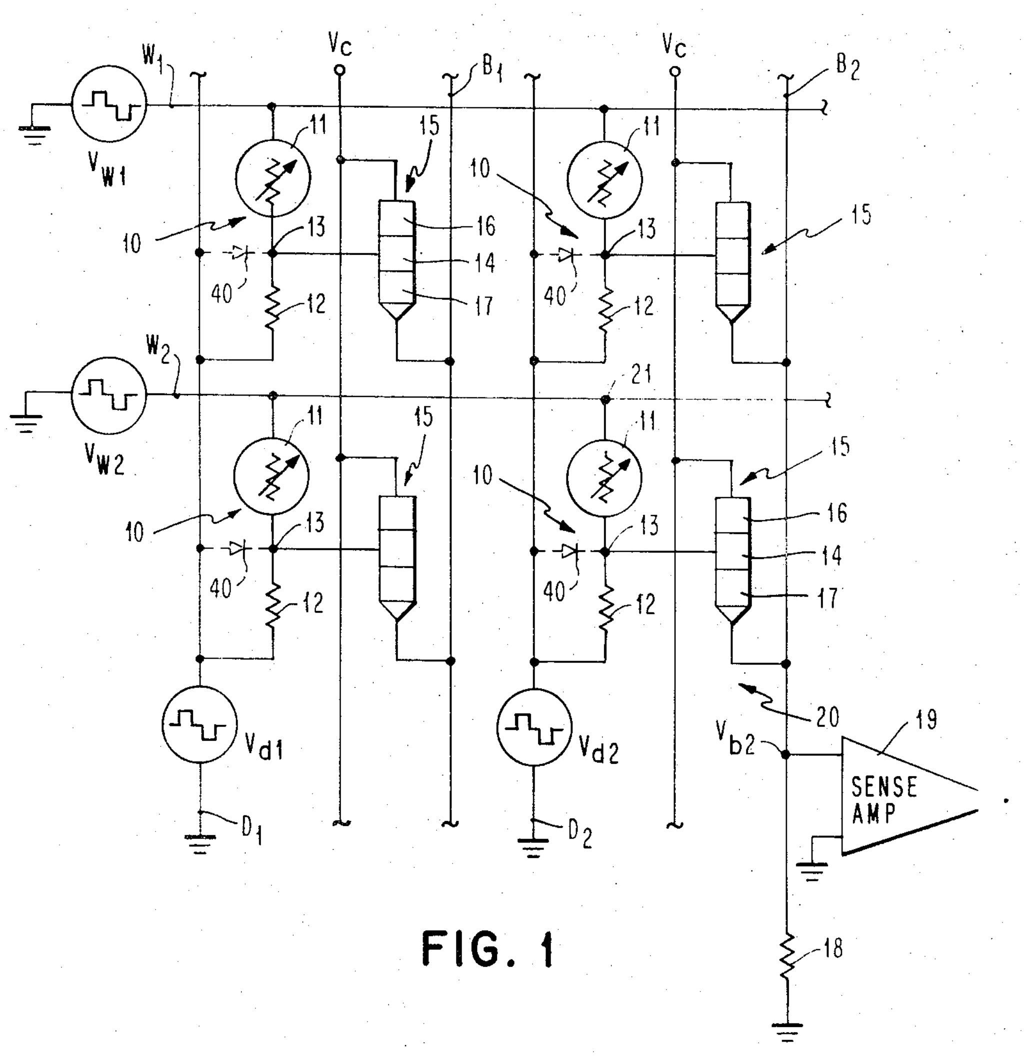
FIG. 1 is a schematic circuit diagram of a portion of a monolithic memory array showing four cells.

With reference to FIG. 1, memory array comprises a plurality of word lines, $W_1$, $W_2$, and a plurality of bit lines, $B_1$ and $B_2$, crossing the word lines. Each word line has a source of variable potential, $V_{w1}$ and $V_{w2}$, applied thereto. This source of variable potential is activated by standard memory addressing means, not shown, Each vertical line of cells has associated therewith a data line, $D_1$, $D_2$, and each data line has applied thereto the second source of variable potential, $V_{d1}$, $V_{d2}$, which also is activated by appropriate standard addressing means, not shown. Each cell which is formed at the intersection of a word and bit line comprises a voltage divider circuit 10 including the combination of a variable switchable bistable resistor device 11 in series with a fixed resistor 12. One end of this resistor series is connected to the word line, e.g., $W_2$, and the other end is connected to the data line, e.g., $D_2$. Node 13 between resistors 11 and 12 is connected to base terminal 14 of transistor 15. The collector 16 of transistor 15 is connected to a fixed voltage source $V_c$ and the emitter 17 of the transistor is connected to the appropriate bit line, $B_1$ or $B_2$. Each bit line is, in turn, connected to a voltage source at ground through a resistor 18. The voltage level of each bit line, e.g., $V_{b2}$, is sensed by an appropriate sense amplifier 19.

Figure 3:
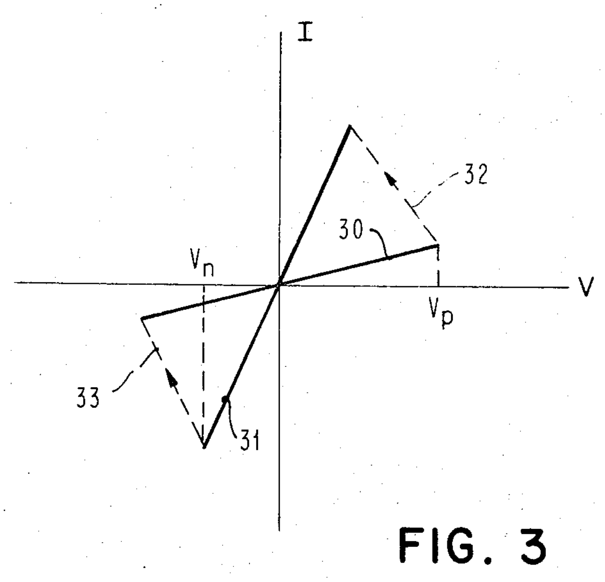
FIG. 3 is an I-V curve to illustrate the two impedance states of known bistable resistors which may be used in the memory array of the present invention.

The variable resistor 11 may be any of the previously described bistable switchable resistors which exhibit a high impedance and low impedance state in accordance with the I-V curve shown in FIG. 3. The structure may be a variable switchable resistance element as described in either U.S. Pat. No. 3,241,009 or U.S. Pat. No. 3,467,945. Previously described bistable heterojunction switchable resistors, as specified in copending application, Ser. No. 46,943, also provide desirable switchable resistors for the memory structure of the present invention. Another desirable group of bistable resistance elements are those described in U.S. Pat. No. 3,336,514; they consist of a sandwich of metal/niobium oxide/bismuth or antimony.

Among the other switchable resistors which may be used are the previously-mentioned Ovonic devices.

In order to illustrate the operation of the circuit of the present invention, let us now go through a "write" and "read" cycle for one of the memory cells 20. Assume that switchable resistor 11 is initially in the high impedance state, line 30, FIG. 3, which is indicative of a "zero" being stored in cell 20. In order to "write" a "one" into cell 20, voltage source $V_{w2}$, which is normally at ground, is raised to 1.5 volts, see FIG. 4. At the same time, voltage source $V_{d2}$, which also is normally at ground, is lowered to −1 volt. This results in a voltage drop of 2.5 volts across the pair of series resistors 11 and 12 and a drop of more than 2 volts of a first polarity across variable resistor 11 between nodes 13 and 21. Since $V_p = 2$ volts, FIG. 3, resistor 11 switches from the high impedance state, line 30, to the low impedance state, line 31, by means of line 32, which is indicative of the storage of a "one" in cell 20.

Now, in writing a "zero" into cell 20, a voltage level of −1 volt is applied by voltage source $V_{w2}$ and a voltage level of +1 volt is applied by voltage source $V_{d2}$, resulting in a voltage drop of 2 volts across resistors 11 and 12 in series. This, in turn, results in a voltage drop of more than 1.5 volts of a plurality opposite to the first voltage drop across variable resistor 11. Since $V_n$ equals this 1.5 volt drop of opposite polarity, see FIG. 3, resistor 11 switches from its low impedance state, line 31, back to its high impedance state, line 30, by means of line 33, which is indicative of a "zero" being stored in cell 20.

Figure 4:
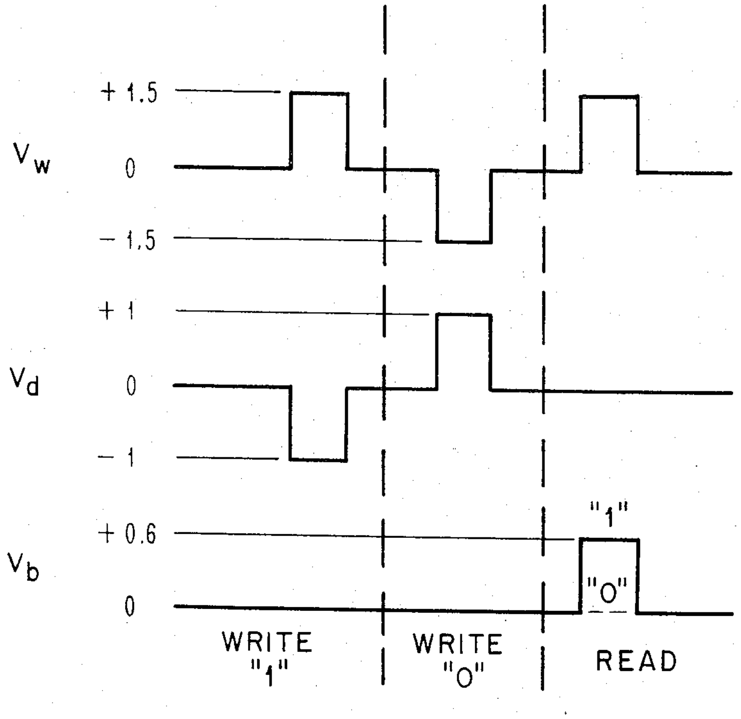
FIG. 4 is a pulse-timing chart to illustrate the operation of the memory cells doing typical "write" and "read" operations.

Considering now the reading of the contents of a cell such as cell 20, a read pulse of 1.5 volts is applied by voltage source $V_{w2}$, FIG. 4. Since data line $D_2$ remains at "zero" or ground level, the voltage drop across series resistors 11 and 12 is 1.5 volts. The values of resistors 11 and 12, with respect to each other, are selected so that when the read pulse of 1.5 volts is applied across series resistors 11 and 12, these resistors will have a voltage-dividing relationship such that node 13 will assume a potential level necessary to render transistor 15 conductive only when bistable resistor 11 is in its low impedance state. This, in turn, will raise node $V_{b2}$ on bit line $B_2$ to a level of 0.6 volt which will indicate that a "one" is stored in cell 20. On the other hand, if variable resistor 11 is in its high impedance state, node 13 will not rise to a level sufficient to render transistor 15 conductive and node $V_{b2}$ will remain at a lower level which is indicative of the storage of a "zero" in cell 20.

It has been found that dependent upon the parameters of the fixed and variable resistors used, it may be in many cases desirable to provide a unidirectional shunt across fixed resistor 12 from variable potential source $V_d$ to node 13. This optional shunt is shown in FIG. 1 by diode 40 shown in dotted line. This unidirectional shunt is non-conductive during the "read" cycle and, hence, will not interfere with the voltage-dividing relationship during this "read" cycle. However, during the "write" cycles, diode 40 will be conductive only during the application of the positive voltage pulse by sources $V_d$ during the "write" cycle for "zero." This expedient is valuable because it is during this switch from the "one" state to the "zero" state that the fixed resistor having a parameter necessary for the voltage-dividing "read" relationship may necessitate relatively high voltages for this switch. When the bistable resistor is in the "one" or low resistance state, the voltage drop across fixed resistor 12 will be relatively large as compared with the voltage drop across the low resistance state variable resistor. This would necessitate the application of relatively high voltage levels by sources $V_{w2}$ and $V_{d2}$ in order to get the voltage across the variable resistor 11 to the level needed to switch it into the high impedance state.

In some cases, it may be desirable to avoid such high voltage levels for heat dissipation purposes. Accordingly, optional diode 40 is included in the circuit and fixed resistor 11 is by-passed during the write "zero" switch to the high impedance state.

The following are some typical parameters for these devices in a cell 20 which will permit the circuit to operate in the manner described when the previously described potential levels are applied to the cell and optional diode 40 shunt is included in the circuit. Fixed potential source $V_c$ may have a level of 1.5 volts; resistor 12 = 10K ohms; resistor 11 = 100K ohms in its high impedance state and 1K ohms in its low impedance state; resistor 18 = 5K ohms and transistor 15 is selected so that it will become conductive when node 13 reaches a level of 0.7 volts; diode 40 requires a voltage level of 0.7 volts in order to be rendered conductive.

If diode shunt 40 is not used, the following parameters will render the circuit operational:

| | | |
|---|---|---|
| $V_w$ | normally | 0 volts |
| | during read and write "one" cycles | 1.5 volts |
| | during write "zero" cycle | 8.5 volts |
| $V_d$ | normally | 0 volts |
| | read | 0 volts |
| | write "one" | 1 volts |
| | write "zero" | +8.5 volts |
| $V_b$ | | 0.6 volts |
| $V_c$ | | 8.5 volts |
| Resistor 12 | | 10 K ohms |
| Resistor 11 | High Impedance State | 100 K ohms |
| | Low Impedance State | 1 K ohms |

| | |
|---|---|
| Resistor 18 | 5 K ohms |
| Transistor 15 conducts when node 13 reaches | 0.7 volts |

Figure 2:
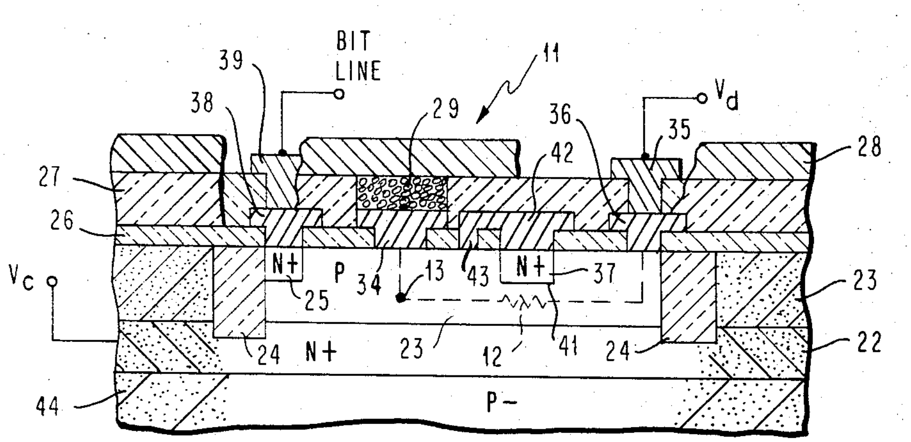
FIG. 2 is a diagrammatic cross-section of a planar monolithic memory integrated circuit to illustrate how bistable switchable resistors may be integrated with conventional integrated circuit elements, such as transistors or resistors, to provide the cells of the array of FIG. 1.

In order to illustrate how the devices of a cell, such as cell 20, may be embodied in an integrated circuit, reference is made to FIG. 2 which is a partial fragmentary cross-section of a planar integrated circuit structure with portions broken away to better illustrate the embodiment. The structure comprises the planar substrate containing P− region 44, N+ region 22 and P region 23. Dielectric insulating regions 24, which may be a material such as silicon dioxide, isolate the cell unit. N+ region 22, which serves as the collector 16 of transistor 15 in FIG. 1, may conveniently be a region continuous with a plurality of cell units to provide the common conductor leading to voltage source $V_c$, as diagrammatically illustrated. N+ region 25 functions as emitter 17 and P region 23, between the N+ regions 22 and 25, serves as the base of the transistor. The circuit of the semiconductor substrate is insulated by a pair of silicon dioxide insulative layers 26 and 27. Device 11 comprises a sandwich of antimony layer 28, niobium oxide layer 29 and niobium layer 34. This sandwich forms a variable resistor which may be made in the manner described in U.S. Pat. No. 3,336,514 and functions in the same manner as the device described in said patent. Voltage source $V_d$ contacts a portion of P layer 23 through metallic contacts 35 and 36. This portion of P region 23 between diffused N+ region 37 and N+ layer 22 functions as a pinch resistor and serves the function of circuit resistor 12, as diagrammatically shown in FIG. 1. Thus, node 13 may be considered to be at the point shown diagrammatically in FIG. 2. Emitter 25 is connected by means of contacts 38 and 39 to the bit line. Antimony line 28 also serves as the word line. The structure shown in FIG. 2 has optional diode 40 of FIG. 1 incorporated. It is formed by the junction formed between N+ region 37 and P region 23. Thus, the shunt path of diode 40 across resistor 12 would be $V_d$ to contact metallurgy 35 and 36 to region 23 across diode junction 41 to region 37 to metallurgy 42 back to node 13 by contact 43.

As previously mentioned, the niobium/niobium oxide device variable resistor shown in FIG. 2 may be fabricated in accordance with the teachings of U.S. Pat. No. 3,336,514. The fabrication of the remaining structure in FIG. 2 is known in the art and will not be described in detail.

It should be noted that transistor 15 provides a gain sufficiently high so that the stored data may be applied directly to bit line $B_2$ from which it may be read directly by sense amplifier 19 without any additional intermediate amplification steps. This contributes to a relatively high speed reading. The transistor has the additional advantage in that during reading, base 14 still presents a high impedance with respect to node 13, even when transistor 15 is conductive and, consequently, the conductivity of transistor 15 has no effect on the voltage-dividing action of resistors 11 and 12.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a monolithic semiconductor integrated circuit memory array having a plurality of word drive lines and a plurality of bit drive lines crossing said word lines, a plurality of memory cells, each respectively connected at a crossing of a word and bit line and comprising:

a voltage divider circuit having a fixed resistor, a variable switchable bistable resistor settable, in response to the application of a pair of electrical potentials of opposite polarities, respectively to either a high or low resistance state, in series with said fixed resistor, one end of said resistor series being connected to said word line, a first source of variable potential connected to the other end of said resistor series, a second source of variable potential applied to said one end of said resistor series through said word line, said variable potential sources being adapted for selectively applying across said resistor series either a first electrical potential level of one polarity, a second electrical potential level of opposite polarity, or a third electrical potential level intermediate said first and second levels, each of said first and second levels being sufficient to respectively switch the bistable resistor to one of its resistance states to thereby "write" in the cell, a transistor having a control terminal connected to a node between said two series resistors and an output terminal connected to said bit line, said transistor being normally non-conductive and said resistor series having a voltage-dividing relationship such that when said third electrical potential is applied across said resistor series, said node will assume a potential level necessary to render the transistor conductive only when the variable resistor is in a predetermined one of its two states, and means connected to said bit line for sensing whether said transistor is conductive to thereby "read" the cell.

2. The memory array of claim 1 wherein said transistor is a bipolar transistor and said control terminal is the base terminal of said transistor.

3. The memory array of claim 1 wherein both of said variable potential sources change in potential level during the application across said bistable resistor of the potential for switching the bistable resistor to either of its two states.

4. The memory array of claim 1 wherein said variable switchable bistable resistor is a heterojunction device having a first region of one material and one conductivity type and a second region of a second material forming a junction with said first region, said second region containing a high density of material imperfections.

5. The memory array of claim 1 further including a unidirectional device shunting the second source of variable potential across said fixed resistor to said node, said unidirectional device being conductive only during the application of one of said pair of electrical potential levels of opposite polarity.

6. The memory array of claim 5 wherein said unidirectional device is a diode.

7. The memory array of claim 1 wherein said variable switchable bistable resistor is a structure comprising a niobium electrode, a niobium oxide insulator and another metal electrode in a sandwich-like arrangement.

8. The structure of claim 7 wherein said another metal electrode is an antimony electrode.

9. The structure of claim 7 wherein said another metal electrode is a bismuth electrode.

10. The memory array of claim 1 wherein only the second source of variable potential changes in level during the application of the third electrical potential level across the resistor series.

11. The memory array of claim 10 further including a unidirectional device shunting the second source of variable potential across said fixed resistor to said node, said unidirectional device being conductive only during the application of one of said pair of electrical potential levels of opposite polarity.

12. The memory array of claim 11 wherein said unidirectional device is a diode.

13. The memory array of claim 12 wherein said fixed resistor end of said resistor series is connected to said first source of variable potential.

* * * * *